May 9, 1939. J. STRECKFUS ET AL 2,157,440
PRINTER'S ROLLER
Filed Sept. 6, 1938

Patented May 9, 1939

2,157,440

UNITED STATES PATENT OFFICE 2,157,440

PRINTER'S ROLLER

John Streckfus, Louis Schmidt, and Harry Godwin, Baltimore, Md.

Application September 6, 1938, Serial No. 228,596

4 Claims. (Cl. 91—67.8)

This invention relates to improvements in printers' rollers composed of vulcanized rubber, or a synthetic rubber composition, or compounds of both, a flexible bond, such as cord, and a flexible glue composition. The flexible bond is vulcanized to the rubber, or synthetic rubber, after which the glue composition is applied to the fabric bond which causes the glue composition to bond securely to the rubber. The fabric bond is used between the rubber and the glue composition as they will not otherwise bond together.

The invention consists of the novel construction and arrangement of parts and combination of parts hereinafter more fully set forth in the following specification and pointed out in detail in the appended claims.

Figure 1:
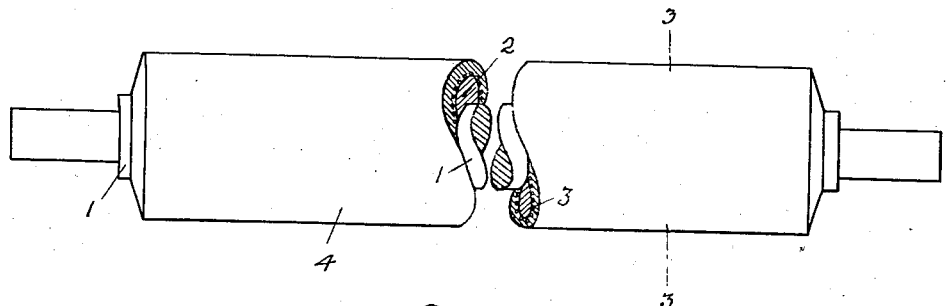
Figure 1 is a side elevation of a printer's roller, the same being broken away and showing our invention applied thereto.
Figure 2:
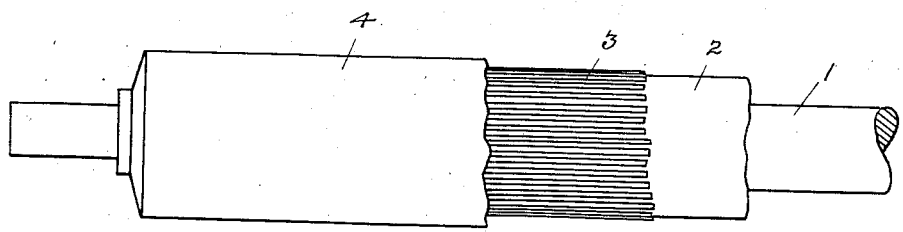
Figure 2 is a section of a portion of a roller, the parts being broken away to show the several layers.
Figure 3:
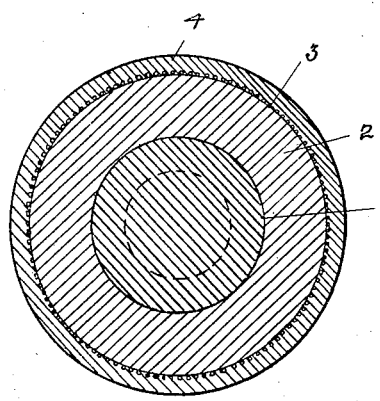
Figure 3 is an enlarged section taken on the line 3—3 of Figure 1.

Referring to the accompanying drawing, forming part of this specification, and in which like reference numerals designate like parts throughout the several views thereof, 1 designates the stock or core, 2 the glue composition, 3 the core binding material, and 4 the outer rubber surface.

In making the rollers, the rubber 4 is laminated on a shaft, or mandrel, and then the cord binding material 3 is laid lengthwise on the rubber 4 which is then vulcanized, binding the fabric to the rubber and forming a sleeve which is taken off the mandrel and turned inside out and inserted in a mold. The stock 1 is then centered in the mold and the glue composition 2 poured or forced into the mold in a hot and fluid condition which causes it to adhere to the cord fabric 3. It is then withdrawn from the mold with the rubber sleeve securely bonded to the composition straight and true, ready for use. A sleeve may also be made by frictioning the cord fabric 3 in a calender, applying the cord fabric on the mandrel and laminating the rubber 4 over this, after which it is taken off the mandrel and inserted in a mold using compressed air to hold it to the sides of the mold during vulcanization and this sleeve is then handled as before, the glue composition being poured in the mold as mentioned above.

Having thus described our invention, what we claim is:

1. A printer's roller comprising a stock, a glue composition surrounding said stock, cords running lengthwise of said glue composition, and a rubber outer surface surrounding said roller and bound to said cords.

2. A printer's roller comprising a stock, a glue composition secured to said stock, cords running lengthwise of said glue composition and vulcanized thereto, and an outer surface of rubber vulcanized to said cords.

3. A printer's roller comprising a stock, a glue composition surrounding said stock, cords running lengthwise of said glue composition on the outer surface thereof and vulcanized thereto, and a rubber outer surface bound to said cords.

4. A printer's roller comprising a stock, a glue composition surrounding said stock, fabric cords extending lengthwise of said glue composition on the outer surface thereof and secured therein, and an outer rubber surface vulcanized to said fabric cords.

JOHN STRECKFUS.
LOUIS SCHMIDT.
HARRY GODWIN.